(12) United States Patent
Botea et al.

(10) Patent No.: US 11,275,902 B2
(45) Date of Patent: Mar. 15, 2022

(54) INTELLIGENT DIALOG RE-ELICITATION OF INFORMATION

(71) Applicant: INTERNATIONAL BUSINESS MACHINES CORPORATION, Armonk, NY (US)

(72) Inventors: Adi Botea, Dublin (IE); Oznur Alkan, Clonsilla (IE); Elizabeth Daly, Dublin (IE); Massimiliano Mattetti, Dublin (IE); Pablo Pedemonte, M. B. Gonnet (AR); Abel Nicolas Valente, Capital Federal (AR); Inge Vejsbjerg, Kilmainham (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 262 days.

(21) Appl. No.: 16/659,216

(22) Filed: Oct. 21, 2019

(65) Prior Publication Data
US 2021/0117506 A1     Apr. 22, 2021

(51) Int. Cl.
*G06F 40/35*     (2020.01)
*G06N 5/02*     (2006.01)
*G06N 20/00*    (2019.01)
*G10L 15/22*    (2006.01)

(52) U.S. Cl.
CPC .............. *G06F 40/35* (2020.01); *G06N 5/02* (2013.01); *G06N 20/00* (2019.01); *G10L 15/22* (2013.01)

(58) Field of Classification Search
None
See application file for complete search history.

(56) References Cited

U.S. PATENT DOCUMENTS

| | | | |
|---|---|---|---|
| 6,510,411 B1 | 1/2003 | Norton et al. | |
| 7,747,438 B2 | 6/2010 | Nguyen et al. | |
| 2005/0033582 A1 | 2/2005 | Gadd et al. | |
| 2013/0086028 A1 | 4/2013 | Hebert | |
| 2016/0117593 A1 | 4/2016 | London | |
| 2017/0147554 A1 | 5/2017 | Chen et al. | |
| 2018/0338041 A1* | 11/2018 | McGann | G10L 15/22 |
| 2019/0164546 A1 | 5/2019 | Piernot et al. | |
| 2019/0341038 A1* | 11/2019 | Bromand | G06F 3/165 |
| 2020/0258509 A1* | 8/2020 | Bharadwaj | H04L 51/02 |

\* cited by examiner

*Primary Examiner* — Stella L. Woo
(74) *Attorney, Agent, or Firm* — Griffiths & Seaton PLLC

(57) ABSTRACT

Various embodiments are provided for providing intelligent dialog re-elicitation in a dialog system in a computing environment by a processor. Information, provided during a dialog using the dialog system, may be detected that has been subsequently revised. One or more variables impacted by the revised information provided during the dialog may be dynamically re-elicited.

17 Claims, 9 Drawing Sheets ent of the present invention;

INTELLIGENT DIALOG RE-ELICITATION OF INFORMATION

BACKGROUND OF THE INVENTION

Field of the Invention

The present invention relates in general to computing systems, and more particularly, to various embodiments for using a dialog system for providing intelligent dialog with optimized re-elicitation of information in a computing environment using a computing processor.

Description of the Related Art

In today's society, consumers, businesspersons, educators, and others communicate over a wide variety of mediums in real time, across great distances, and many times without boundaries or borders. The advent of computers and networking technologies have made possible the increase in the quality of life while enhancing day-to-day activities.

Computing systems may be found in the workplace, at home, or at school. Due to the recent advancement of information technology and the growing popularity of the Internet, a wide variety of computer systems have been used in machine learning. Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables.

A major focus of machine learning research is to automatically learn to recognize complex patterns and make intelligent decisions based on data. As great strides and advances in technologies come to fruition, these technological advances can be then brought to bear in everyday life.

SUMMARY OF THE INVENTION

Various embodiments are provided for providing intelligent dialog re-elicitation in a dialog system in a computing environment by a processor. Information, provided during a dialog using the dialog system, may be detected that has been subsequently revised. One or more variables impacted by the revised information provided during the dialog may be dynamically re-elicited.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
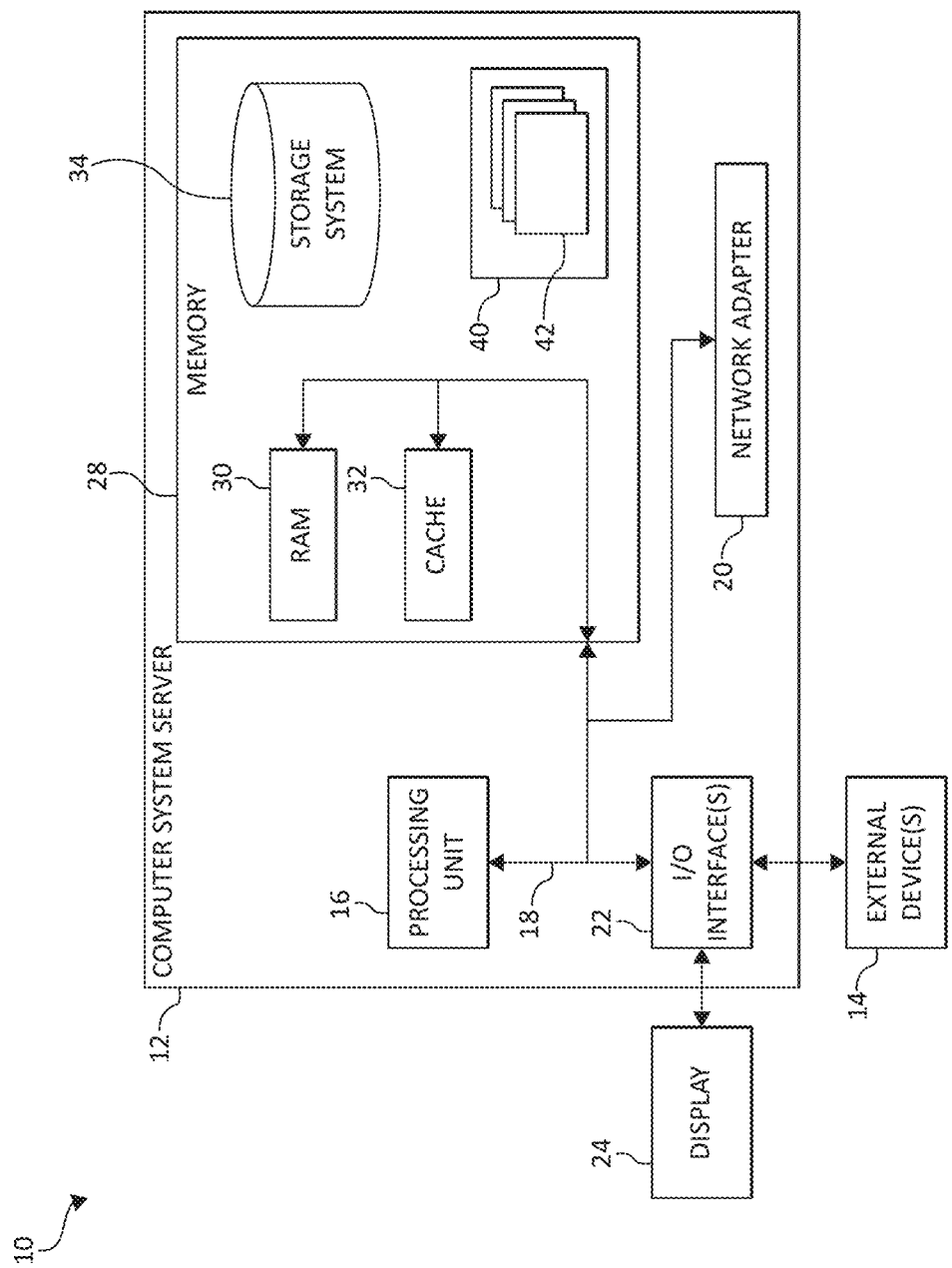
FIG. 1 is a block diagram depicting an exemplary computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances may include computers, smartphones, laptops, home appliances, audio systems, televisions, security cameras, security sensors, among countless other examples. Such IoT computing systems may be employed in dialog systems, energy systems (e.g., energy grids), water networks, traffic networks, smart buildings, and the like.

For example, dialog systems play a key role in the functioning of an organization, such as a business, government, group or other entity. For example, many critical decisions, plans, and/or goals may result from discussions in chat systems, or chat-like conversation systems or chatbots. A chatbot may be an operation which conducts a dialog or conversation, audible, visual, and/or via textual methods. However, current dialog systems, along with Artificial Intelligence ("AI")/machine learning systems, are unable to adapt a dialog when a user revises information previously available (e.g., change their mind about some information) using the dialog system. Said differently, many AI systems/dialog systems exhibit great difficulty in the providing intelligent dialog with optimized re-elicitation of information.

To further illustrate, consider a dialog where a user provides information (e.g., preferences). It is possible that the user may change their mind about some preference P (or any other kind of information) at any subsequent point in a dialog. As a result, part of the context becomes obsolete (e.g., data computed with P as an input). However, a precomputed dialogue plan that allows the user to change any preference at any time is impractical as it would require a branch for each preference in each state. Accordingly, a need exists for providing a solution to fix, adapt, and/or re-elicited all obsolete data and adapting the dialogue plan and/or goal.

Thus, the present invention provides a computing system that provides an intelligent dialog re-elicitation in a dialog system for a user. Information, provided during a dialog using the dialog system, may be detected that has been subsequently revised. One or more variables impacted by the revised information provided during the dialog may be dynamically re-elicited.

In one aspect, for revised information occurring during the dialog, one or more dependencies and one or more variables to re-elicit from data based upon the revised information may be learned, where the data includes previous dialogs that may have been with the same user or different users. When re-eliciting a variable, for each option that the user may select, one or more of the following may be performed. For example, in step 1) an expected number of dialog turns in the remaining dialog may be estimated. 2) One or more previous choices can be kept unchanged. 3) A user may be enabled to optimize conversation and re-usage of previous choices (e.g., based on step 2). 4) A user may engagement be enabled (e.g., based on step 2). 5) An argument that the dialog changes dynamically, as opposed to jumping back into the dialogue plan and the user engagement actions may added after re-elicitation.

For example consider the following example of a dialog with a user. Assume a user selects 1) a desired movie to watch, 2) a particular movie theatre, and 3) a transportation mode for traveling to the theatre. The variable for theater ("Th") depends on the movie variable ("M") (e.g., M depends on Th). The variable for transportation ("Tr") depends on the theater ("Th") variable (e.g., Th depends on Tr. Assume at a subsequent period of time, the user changes their mind about the movie. Thus, at this point, the present invention may be activated/triggered upon detection of revised information and adapt the dialog so that all information affected by the change may be optimized and updated. For example, variables M, Th and potentially Tr may each require an update. The present invention may elicit a new movie (e.g., engaging in a dialog turn with the user to elicit the updated information) and update variable M. Also a new theatre may be elicited and update the variable Th. If the new variable Th value is the same as before, there is no need to update variable Tr. If the new variable Th value is different, the variable Tr may be updated.

At this point, multiple dialog turn adaptations may be employed based on one or more dependencies between variables and revised/changed data provided by the user. In one aspect, data dependencies may be tracked (e.g., A depends of B if A has to be instantiated before instantiating B). When the user changes their mind about a particular variable (e.g., variable "P"), the change or altered information caused by the user may trigger the need to update other variables (e.g., variables that depend on variable P). A list of variables that need to be updated may be tracked and/or maintained. Each time new elements are added to the list of variables that need to be update, a new dialog plan suitable to the new context (e.g., ensuring variables that are impacted by the revised information is updated) may be re-planned, which re-planning may include the operations of determining a new dialogue plan suitable to the new context.

In one aspect, the revised information may be information related to one or more domains. In one aspect, a domain may be a knowledge domain or ontology. For example, various domain examples include, but are not limited to, a calendar management, career advice domain, trip/travel planning domain, a shopping domain, planning domain, an educational domain, and other various types of domains. A dialog system enables a user to engage in the planning (e.g., career plan) and/or goal setting (e.g., attending an event at a determined time) through a natural dialog using the dialog system.

It should be noted that as used herein, a computer system may be a dialog system (e.g., dialog agent) capable of automatically reasoning, learning, and applying human-type commonsense knowledge and extracting the implicit meaning from each user response. In an additional aspect, mechanisms of the illustrated embodiments provide an intelligent dialog system having (or having access to) a knowledge or ontology about one or several domains with the ability to apply, learn, and infer common sense knowledge. The intelligent dialog system may be in communication with an interactive graphical user interface ("GUI") or other computing systems such as, for example, an Internet of Things ("IoT") computing device.

To further illustrate, consider the following for repeated re-elicitation and/or re-planning. In one aspect, a number of data dependencies (e.g., A is dependent on B if A has to be instantiated before instantiating B) may be tracked, maintained and/or analyzed. When a user changes information relating to one or more variables (e.g., user's mind changes about variable "P"), a requirement and/or need to update other variables may be triggered. In one aspect, the present invention may dynamically maintain/keep track of a list of variables that need to be updated. Every time new elements are added to that list of variables a re-planning operation may be performed. In one aspect, "re-planning" may refer to the operation of determining a new dialog plan and/or goals suitable to a new context (e.g., updating variables impacted by the changed information). In one aspect, it should be noted that revised information in a dialog may be one or more variables having one or more dependencies and/or sub-variables in a plurality of domains.

Thus, the present invention may perform a repeated, re-planning and execution ("RRE") operations for plan/goal A, according to the following pseudocode/algorithm which may perform the following actions steps:

Input: goal "g", context "C" (e.g., all knowledge in the dialog such as, for example, variables with instantiations), dependency graph D (e.g., graph dependencies among variables such as, for example, where variable M is dependent on variable Th), context variable "v" (e.g., is the variable about which the user changes their mind), domain δ, and ι is a planning instance Output: dialog plan π, state s, context C:
    Step 1: A←{v}∪Succ(v, D)
    Step 2: while A≠∅do:
    Step 3: ι←BuildInstance (C,g,A)
    Step 4: π←Compute Plan (δ, ι)
    Step 5: A←ExecPlus (C, π, D, A)), which may perform the following actions steps. In step 1, instantiate a data set with variables to update A to v plus its direct successors in D, where D is a graph of dependencies among a plurality of variables (e.g., variable M dependent upon variable TH where "M" is the "movie" variable and "TH" is the theater variable by way of example only), C is all knowledge in the dialog (e.g., variables and instantiations), and v is a variable about which a mind of a user may be changed. The delta may be equal to the planning domain in a planning domain definition language ("PDDL") with the goal being the goal of the dialog. In step 2, while A does not equal zero ("0"), a new planning instance may be built where all variables in A are required to obtain a new value, as in step 3. In step 4, a planning system may be called to determine/compute a new plan.

In step 5, the new plan (e.g., run dialog) may be executed and dynamically maintain the new plan A upon 1) obtaining a new value from new plan A and v may be removed from A. If variable v's new value is different than before, all variable v's direct successors in D may be added to plan A and then return/complete re-planning as the new plan upon completion of the new elements being added to plan A.

In an additional aspect, the present invention provides for intelligent dialog re-elicitation in a dialog system. In one aspect, the present invention allows to re-elicit information impacted in a dialog after the user decides to revisit a given bit of information and make a change. Where re-elicitation includes information that is impacted, and excludes information not impacted: 1) analyzing the information in the dialog system that is directly impacted by revised data, and initialize the list A of information bits (e.g., variables) that needs re-elicitation; interleaving the execution of the dialog while dynamically maintaining the list A, 3) adapting the dialog, possibly every time when list A gets new elements, so that the new plan includes steps necessary to re-elicit information mentioned in A, and/or 4) maintaining/keeping the dialog oriented towards its original goal.

For each new candidate value for an invalidated variable, the present invention determines/computes and provides an estimated time (e.g., number of dialog turns) needed in the subsequent part of the dialog to re-elicit all the information needed and to achieve the goal of the dialog. Also the present invention, for each new candidate value for an invalidated variable, determines/computes and provides an estimated number of previous user decisions (e.g., selected values) that can be re-used after selecting the candidate value.

In one aspect, the re-elicitation operation may trigger an additional number of user engagement actions into the dialog plan such as, for example, actions that inform the user the remaining length of the dialog, and/or how many previous decisions could be reused. Also, the present invention may learn one or more dependencies between variables and/or variables to re-elicit. The data can include previous dialogs with the same user or with other users. In one aspect, dependencies between variables may be given as input, or learned. Also, each re-elicitation may be based on a multi-turn conversation. The adaptation of the dialog may be based on re-planning, where the adaptation of the dialog keeps the old plan and modifies the current state in the plan. Also, a change to "information" may be caused by the user changing information in the plan, where the change may be caused by the user changing their mind and/or where the change is caused by the user running a "what-if" analysis.

It should be noted as described herein, the term "intelligent" (or "cognition") may be relating to, being, or involving conscious intellectual activity such as, for example, thinking, reasoning, or remembering, that may be performed using a machine learning. In an additional aspect, intelligent or "intelligence" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, judgment reasoning knowledge, and/or processes that may be determined and/or derived by machine learning.

In an additional aspect, intelligent or "intelligence" may refer to a mental action or process of acquiring knowledge and understanding through thought, experience, and one or more senses using machine learning (which may include using sensor-based devices or other computing systems that include audio or video devices). Intelligent or "intelligence" may also refer to identifying patterns of behavior, leading to a "learning" of one or more problems, domains, events, operations, or processes. Thus, an intelligent (e.g., cognitive) model may, over time, develop semantic labels to apply to observed behavior, domains, problems, judgment reasoning knowledge and use a knowledge domain or ontology to store the learned observed behavior, problems, judgment reasoning knowledge, and domain. In one embodiment, the system provides for progressive levels of complexity in what may be learned from the one or more dialogs, operations, or processes.

In an additional aspect, the term intelligent or "intelligence" may refer to an intelligent or "intelligence" system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale.

An intelligent system may perform one or more computer-implemented intelligent/cognitive operations that approximate a human thought process while enabling a user or a computing system to interact in a more natural manner. An intelligent system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the intelligent/cognitive operation(s), examples of which include, but are not limited to, question answering, identifying problems, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security parameters, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
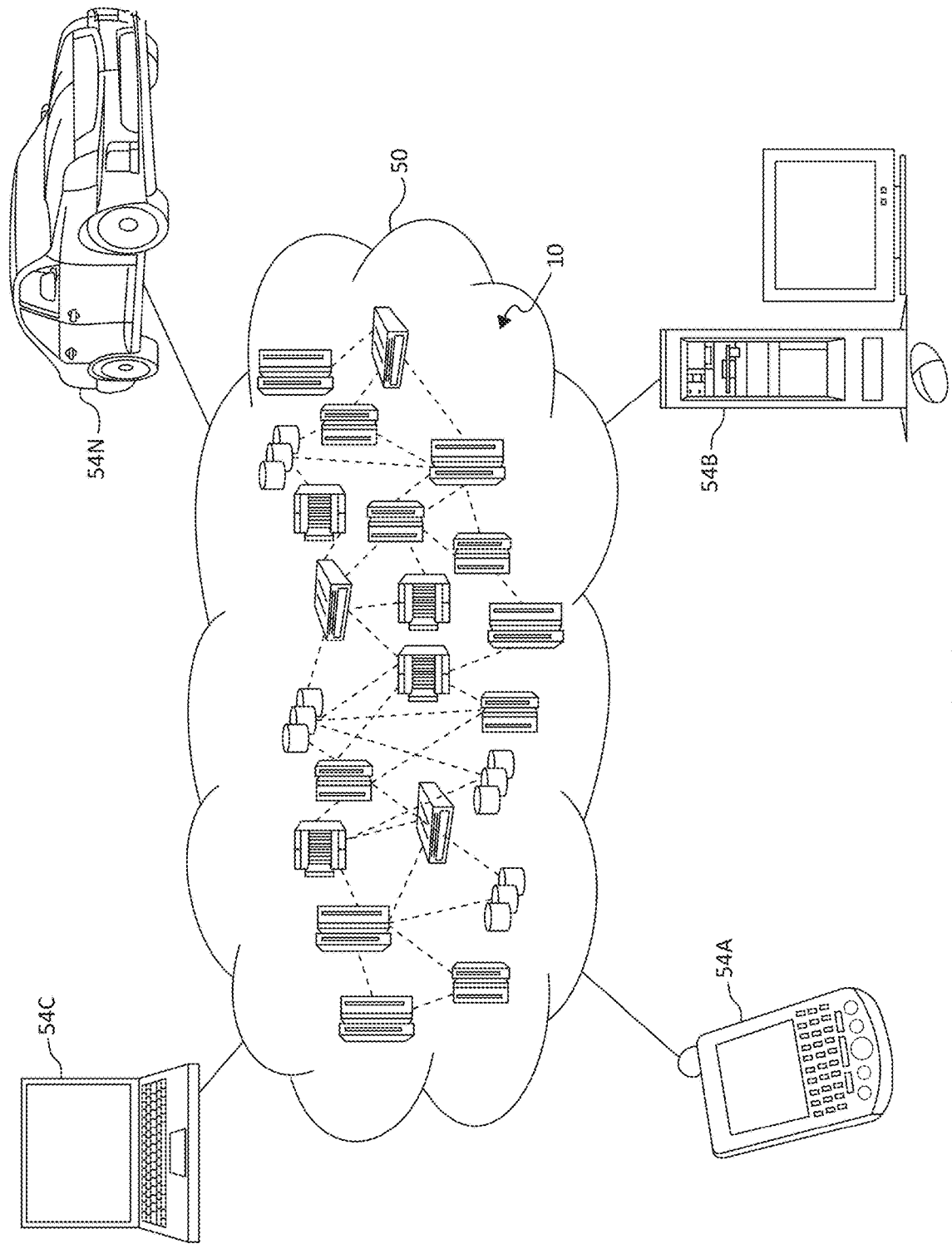
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or other type of computer systems 54N (e.g., an automobile computer system) may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
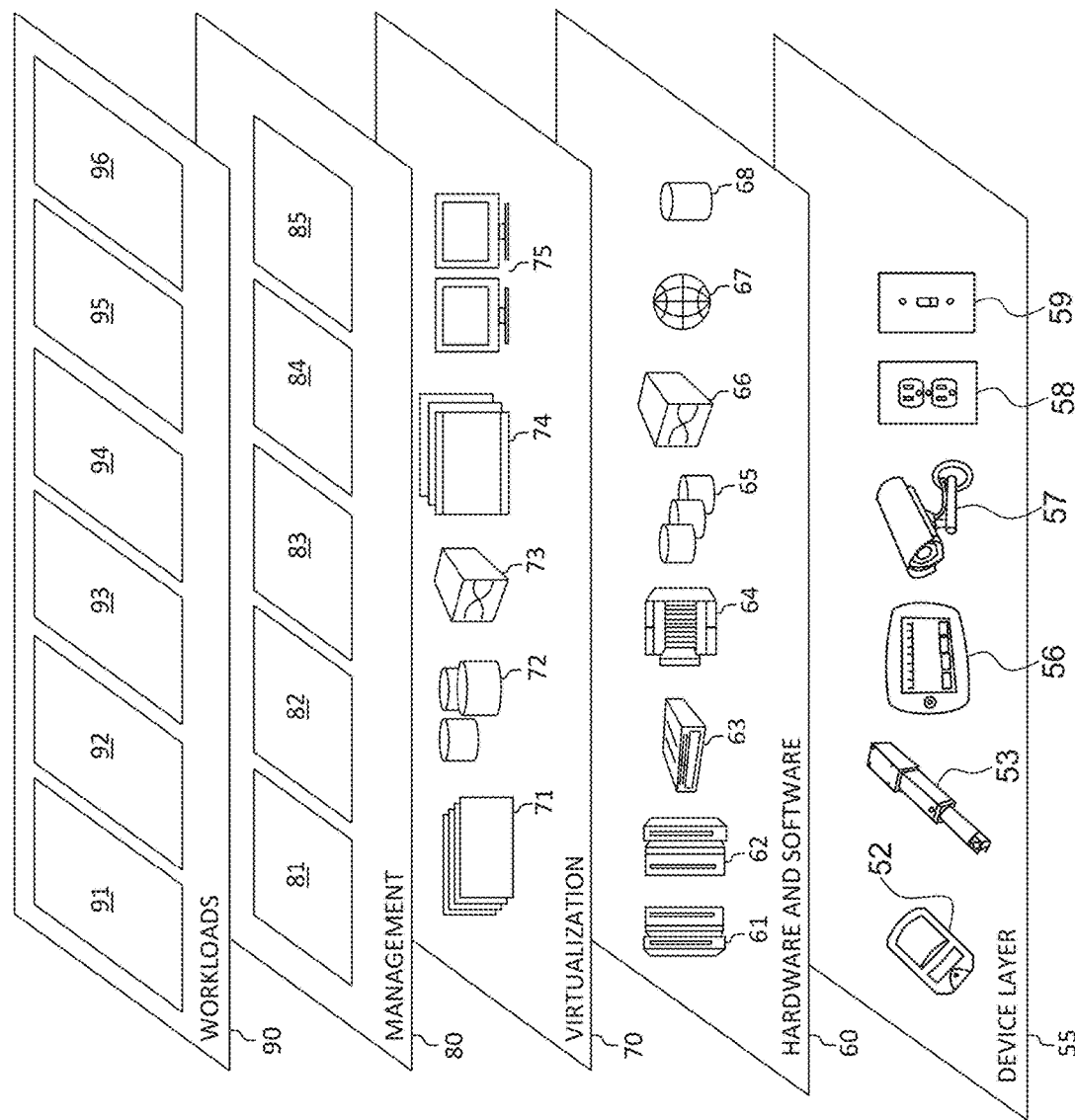
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, workloads and functions 96 for intelligent dialog re-elicitation in a dialog system. In addition, the workloads and functions 96 for intelligent dialog re-elicitation in a dialog system may include such operations as data analytics, data analysis, and as will be further described, notification functionality. One of ordinary skill in the art will appreciate that the workloads and functions 96 for intelligent dialog re-elicitation in a dialog system may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
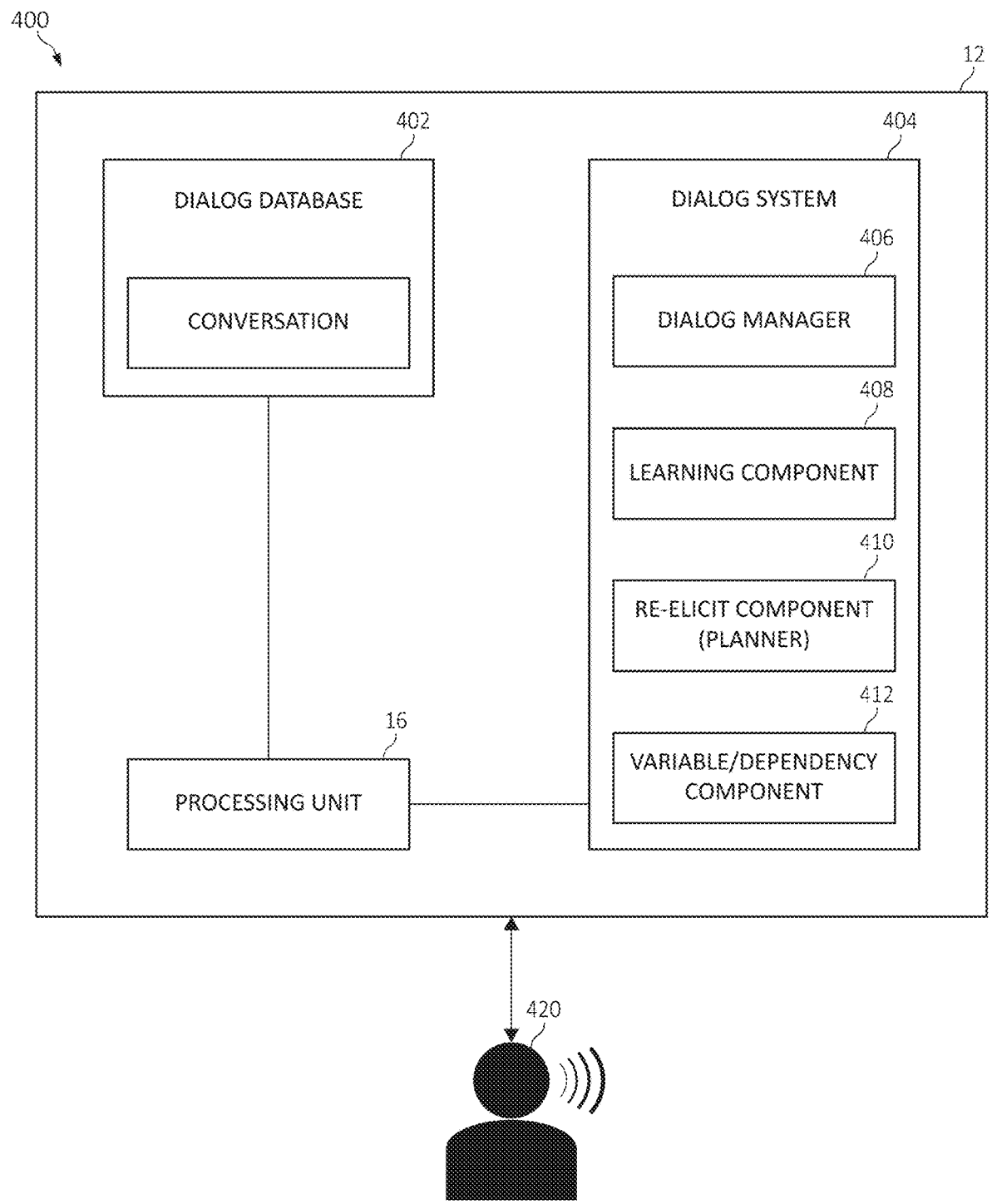
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. FIG. 4 illustrates workloads and functions for providing intelligent dialog re-elicitation in a dialog system in a computing environment. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for cognitive data curation in accordance with the present invention. Many of the functional blocks 400 may execute as background processes on various components, either in distributed computing components, or on the user device, or elsewhere. Computer system/server 12 is again shown, incorporating processing unit 16 (and memory 28 of FIG. 1—not shown for illustrative convenience) to perform various computational, data processing and other functionality in accordance with various aspects of the present invention.

The system 400 may include a dialog database 402 and a dialog system 404. The dialog system 404 may include a dialog manager 406, a learning component 408, and a re-elicit component 410 (e.g., planner), and/or a variable/dependency component 412.

The dialog database and the dialog system 404 may each be associated with and/or in communication with each other, by one or more communication methods, such as a computing network. In one example, the dialog database 402 and the dialog system 404 may be controlled by a user/owner, entity, or technician/administrator associated with the computer system/server 12.

In one aspect, the computer system/server 12 may provide virtualized computing services (i.e., virtualized computing, virtualized storage, virtualized networking, etc.) to the dialog database 402 and the dialog system 404. More specifically, the computer system/server 12 may provide virtualized computing, virtualized storage, virtualized networking and other virtualized services that are executing on a hardware substrate.

As depicted in FIG. 4, the dialog database 402 may be one or more knowledge domains that may also include an ontology, knowledge base, and/or other data (e.g., historical dialogs/data). The knowledge domain of the dialog database 402 may have multiple knowledge domains and may be a combination of domains, concepts, relationships between the domains or concepts, machine learning data, features, parameters, data, profile data, historical data (e.g., historical dialogs with one or more users), or other specified/defined data for eliciting, re-eliciting, monitoring, detecting, learning, analyzing, and/or maintaining data, concepts, and/or relationships between the concepts. In an additional aspect, the knowledge domain of the dialog database 402 may be and/or provide a query-search system such as, for example, the internet. Additionally, the dialog database 402 may include data pertaining to current and/or historical conversations in the knowledge domains.

In one aspect, the dialog system 404 may be used for engaging in a dialog with a user. The dialog manager 406, working in conjunction with the re-elicit component 410, may provide to a user a communication (e.g., a query, comment, question, etc.) and detect information provided during a dialog using the dialog system has been subsequently revised. The dialog manager 406 may maintain a dialog plan or goal of the dialog while dynamically re-eliciting one or more variables.

The re-elicit component 410 may dynamically re-elicit one or more variables impacted by revised information provided during the dialog.

The learning component 408, which may include using one or more machine learning operations, may be used to identify and learn a plurality of dependencies between the one or more variables impacted by the revised information relating to the dialog, a plurality of historical dialogs, or a combination thereof.

That is, the learning component 408 may analyze a dialog and determine (e.g., identify, determine, recognize, analyze, etc.) that the response fails to match one or more possible/expected pieces of information revised by the user 420 (e.g., the user has changed a dialog goal, plan, and/or intent such as, for example, a change to the user's mind (e.g., intent)). That is, the learning component 408, working in conjunction with the re-elicit component 410, may determine a response to a communication during a dialog with a user using the dialog system 404 indicates that changed information will impact one or more variables and dependencies.

The learning component 408, in association with the re-elicit component 410, may estimate an expected number of dialog turns remaining in the dialog according the revised information, wherein a dialog turn is at least one communication each between the dialog system and a user. Also, the learning component 408, in association with the re-elicit component 410, may estimate a selected number of previous decision that remain unchanged based on the revised information.

The learning component 408, in association with variable/dependency component 412, may determine a degree of impact upon the one or more variables caused by the revised information. The learning component 408, in association with variable/dependency component 412, may confirm or reject one or more changes to the one or more variables having the degree of impact less than a defined threshold.

The learning component 408, in association with variable/dependency component 412, may initialize a machine learning mechanism to learn the one or more variables impacted by the revised information, learn those of the one or more variables to re-elicit, suggest one or more alternative action steps, task, or event to maintain dialog plan or goal of the dialog, or providing one or more simulated dialog turns remaining in the dialog according the revised information. A dialog turn may be at least one communication each between the dialog system and a user. For example, learning component 408 may initialize a machine learning mechanism. The learning component 408 may use one or more machine learning operations (e.g., an instance of IBM® Watson® such as Watson® Assistant). (IBM® and Watson® are trademarks of International Business Machines Corporation.) The learning component 408 may use natural language processing (NLP) and artificial intelligence (AI) may also be used to learn, extract, and infer the judgment reasoning knowledge.

It should be noted that learning component 408 may be a machine learning component for training and learning one or more machine learning models and also for learning, learning variables and dependencies, applying inferences, and/or reasoning pertaining to one or more domains, concepts, features, problems and relationships between the domains, or a combination thereof to the machine learning model for the dialog manager 406. For example, the learning component 408 may learn one or more dependencies between each variables in a selected domain.

In one aspect, the learning component 408 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back-propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
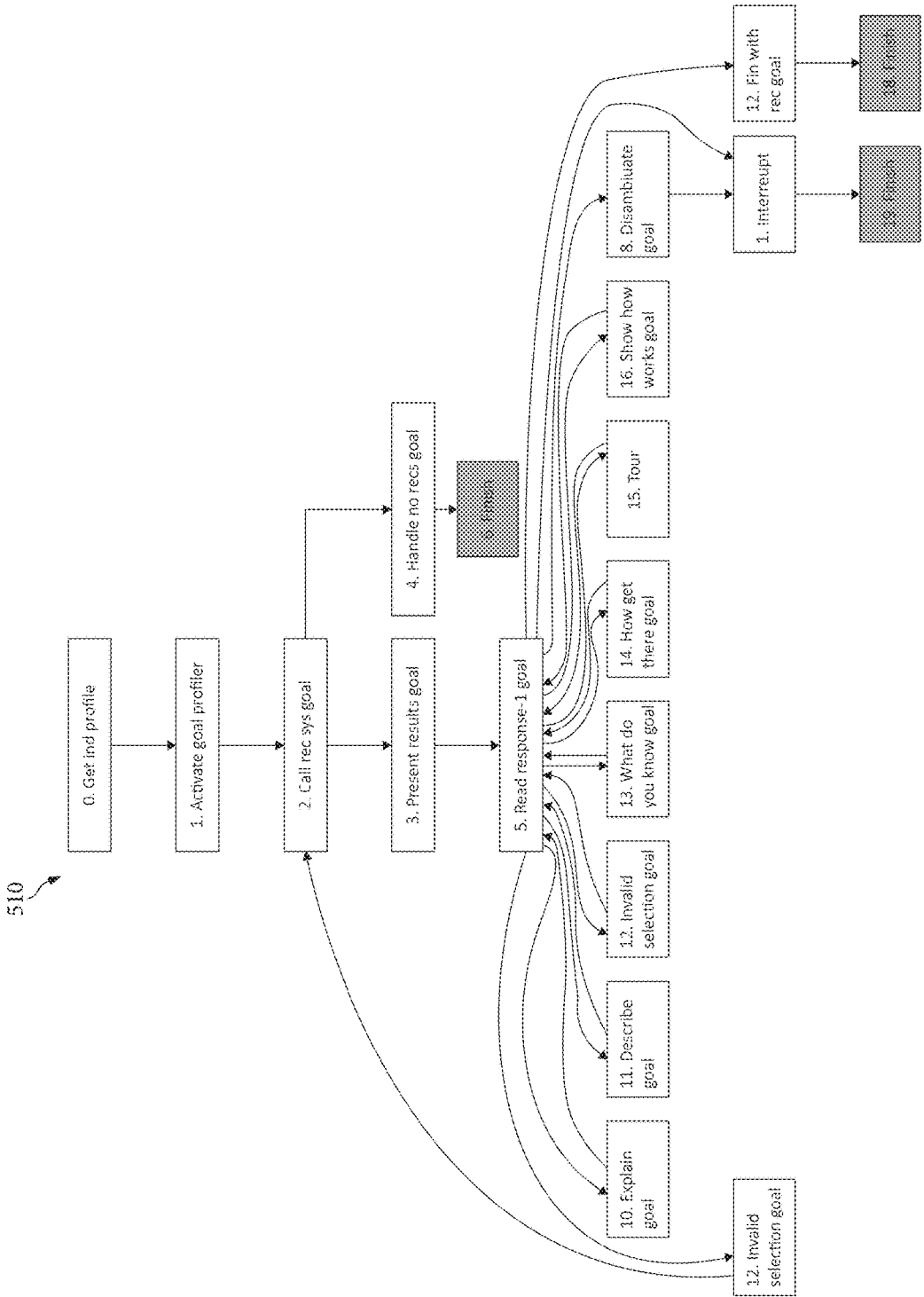
FIG. 5 is an additional block diagram depicting operations for an elicitation operations in a dialog in a dialog system in a computing environment in accordance with an embodiment of the present invention.

Turning now to FIG. 5, a block diagram 500 of a multi-turn dialog 510 for an elicitation operations in a dialog in a dialog system in a computing environment in a dialog system according to various aspects of the present invention. As will be seen, many of the functional blocks may also be considered "modules" or "components" of functionality, in the same descriptive sense as has been previously described in FIGS. 1-4. That is, operations of FIG. 5 may be employed using the dialog system of FIG. 4. Repetitive description of like elements, components, modules, services, applications, and/or functions employed in other embodiments described herein is omitted for sake of brevity. It should be noted that the block diagrams containing any steps and/or operations are for illustrative purposes and not to be considered as limiting steps/operations, but rather to illustrate various operations that may be included in the multi-turn dialog 510.

As a preliminary matter, a single elicitation can be a complicated dialog with a significant amount of time consuming as compared to filling of a field in a form in one step and a requirement for saving unnecessary re-elicitation information while a user aborting the dialog having an extreme negative impact. A dialog turn is at least one communication each between the dialog system and a user. Using the dialog system (e.g., dialog system 404 of FIG. 4), a recommender system may be queried for providing preferences about recommendations and a property. One or more details and explanations about recommendations may be received. Such operations may include one or more many iterations.

A multi-turn dialog such as, for example, multi-turn dialog 510, may engage in multiple dialog turns with a user. For example, in one aspect, a dialog turn may provide a query to a user with the user providing at least one communication/response back to the dialog system. Based on the response from the user, the dialog system may issue another communication/query to the user with the user providing another communication/response back to the dialog system. Such operations may iteratively repeat resulting in one or more variables being included in the multi-turn dialog 510 along with multiple dependencies associated with one or more of the variables.

Thus, the present invention, employing one or more components of FIGS. 1-4 (e.g., dialog system 404 of FIG. 4) for providing intelligent dialog with optimized re-elicitation of information.

In one aspect, one or more features may be used in the multi-turn dialog 500 (see also multi-turn dialog 510A-C used in FIG. 6) provided by the dialog system such as, for example, the dialog system 404 of FIG. 4. The multi-turn dialog 510 (e.g., multi-turn conversations) may be used for one elicitation and may perform additional operations/actions in addition to filling in fields (e.g., adding texts to fields) such as, for example, 1) executing calls to recommender systems and/or to external services. On re-planning, one or more new actions may be inserted to maintain engagement with a user engaged. Also, the multi-turn dialog 500 may include explaining requirements for additional re-elicitation based upon revised information. The multi-turn dialog 510 may also provide an expected time, an expected number of dialog turns to perform re-elicitation, and/or an expected number of re-elicitations.

The multi-turn dialog 510 may be used for eliciting and re-eliciting based upon a particular variable (e.g., variable "A") dynamically changing (e.g., insert engaging actions and/or fewer iterations because of a newer user profile).

In one aspect, when re-eliciting a variable, one or more options when re-eliciting a variable may be ranked. For new options for an invalidated variable, an amount of information for re-elicitation may be estimated, which may be measured as a length of dialog and/or measured as how many previous choices may be reused. The multi-turn dialog 510 may present such information to the user either directly and/or upon request (e.g., through a new type of dialogue action). One or more uses may select options that would minimize the expected overheads (measured as above) triggered by selecting a provided option via the multi-turn dialog 510.

In one aspect, the dialog system such as, for example, the dialog system 404 of FIG. 4 may employ the multi-turn dialog 510 and learn dependencies and variables to re-elicit. In one aspect, data such as, for example, previous dialog traces with the same user or with different users, may be identified, analyzed, and/or used. One or more sequences of variable re-elicitations with variable/value (e.g., var, value) pairs may be extracted using the multi-turn dialog 510. One or more variable dependencies may be created/built from the sequences with frequency count (e.g., variable 1 "var 1" depends on variable 2 "var 2" with the source identified with the destination) dependencies. For a selected source variable, a frequency threshold for destination variables may be used. Also, an active learning operation may be used, which may include one or more dialog actions in the multi-turn dialog 510 that allow the user to confirm and/or reject dependencies with a relatively small confidence level.

For example, the multi-turn dialog 510 may be used and designed for planning a trip that may require the user to specify options such as, for example, 1) dates of the trip, 2, one or more destinations, 3) means of transportation, and/or 4) lodging/hotels. If the user decides/chooses to alter any information regarding the dates of the trip, the multi-turn dialog 510 system may suggest to the user one or more new alternative dates that may allow the user to maintain the rest of the plan without any changes. In this regard, the dialog system 404 of FIG. 4 may employ the multi-turn dialog 500 to provide a more efficient and user-friendly behavior as compared to requiring the user to select new values for all the fields that were reset after the user modified the dates of the trip.

As an additional example, the multi-turn dialog 510 may be used and designed for engaging with the user for career coaching dialog. In one aspect, the user selects 1) a career goal (e.g., a job and role) through the multi-turn dialog 510, 2) a career pathway to that goal through the multi-turn dialog 510, and/or 3) a learning resource for the next role ("NR") along the pathway through the multi-turn dialog 510. Later, upon the user changing the career goal, one or more variables and dependencies may be dynamically changed in the multi-turn dialog 510.

Figure 6:
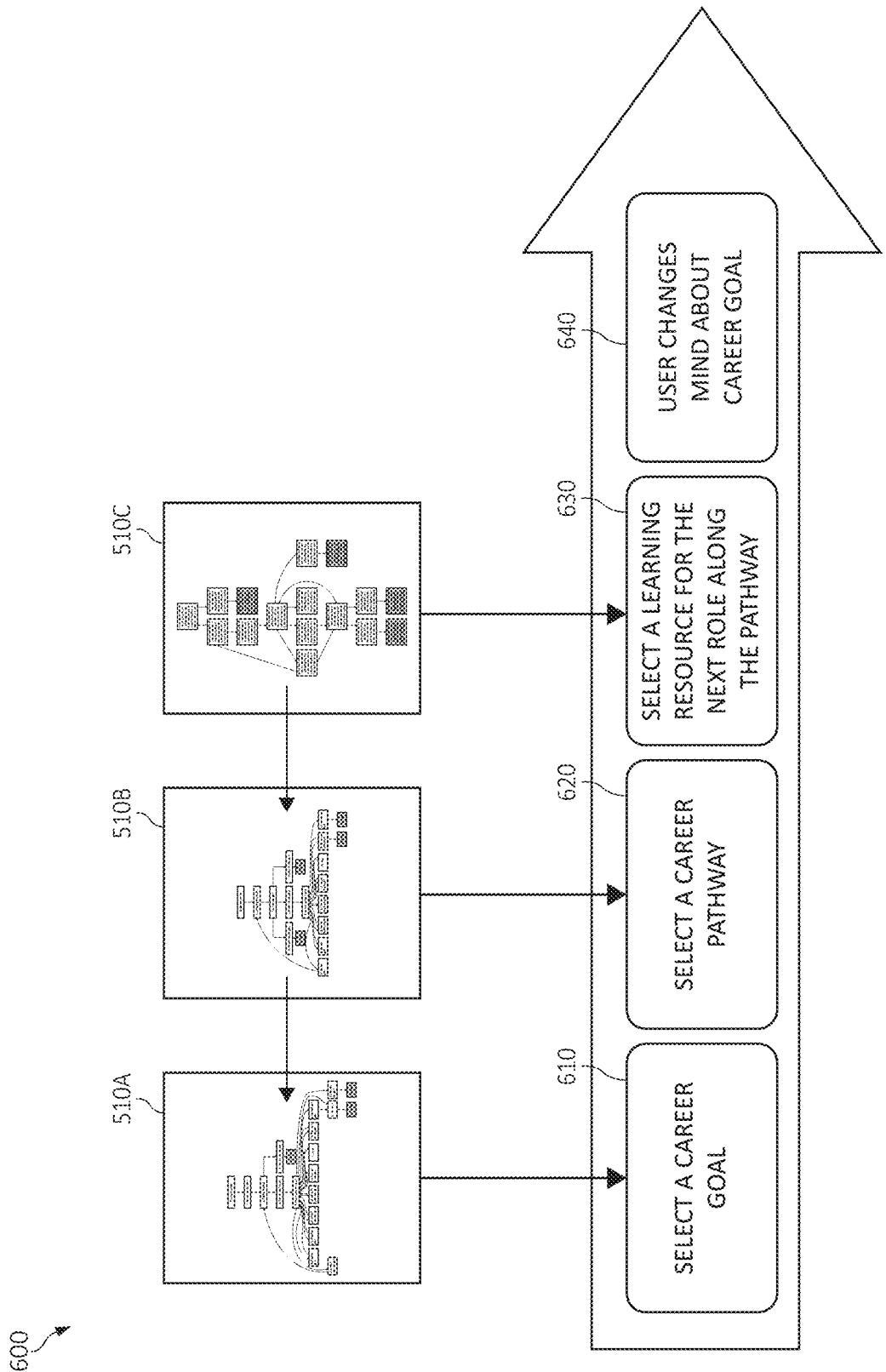
FIG. 6 is an additional block diagram depicting operations for providing intelligent dialog re-elicitation in a dialog system in a computing environment in accordance with an embodiment of the present invention.

Turning now to FIG. 6, a block diagram of exemplary functionality 600 operations for providing intelligent dialog re-elicitation in a dialog system in a computing environment in a dialog system according to various aspects of the present invention. As will be seen, many of the functional blocks may also be considered "modules" or "components" of functionality, in the same descriptive sense as has been previously described in FIGS. 1-5. That is, operations of FIG. 6 may be employed using the dialog system of FIG. 4 and a multi-turn dialog such as, for example, the multi-turn dialog 500 of FIG. 5 (see multi-turn dialog 510A-C of FIG. 6). Repetitive description of like elements, components, modules, services, applications, and/or functions employed in other embodiments described herein is omitted for sake of brevity.

Starting in block 610, a multi-turn dialog (e.g., multi-turn dialog 510A) may be used to elicit a particular plan and/or goal (e.g., a career goal) from a user. For example, the multi-turn dialog 510A may be used for engaging in a career coaching dialog where the user, by way of example only, selects "computing software developer" as the career goal.

In block 620, a particular pathway (e.g., a career pathway) may be selected using a multi-turn dialog (e.g., multi-turn dialog 510B) such as, for example, a junior software developer, senior software developer, project manager architect, etc.

In block 630, multi-turn dialog (e.g., multi-turn dialog 510C) may be used to select a learning resource (which may include a knowledge domain) for identifying a subsequent actions step (e.g., next role) along a plan pathway (e.g., a career plan pathway). For example, the learning resource may be identified as website such as, for example, "www.ACMElearningresource.abc".

In block 640, data/information may be revised such as, for example, a user may revise (e.g., alter/change) information (e.g., change the user's mind) relating to the particular plan (e.g., changes a career goal). At this point, the multi-turn dialog (e.g., multi-turn dialog 510 of FIG. 5) may be updated based upon the revised information, which is further illustrated in FIGS. 7A-7B for updating one or more variables and/or dependencies.

Figure 7A:
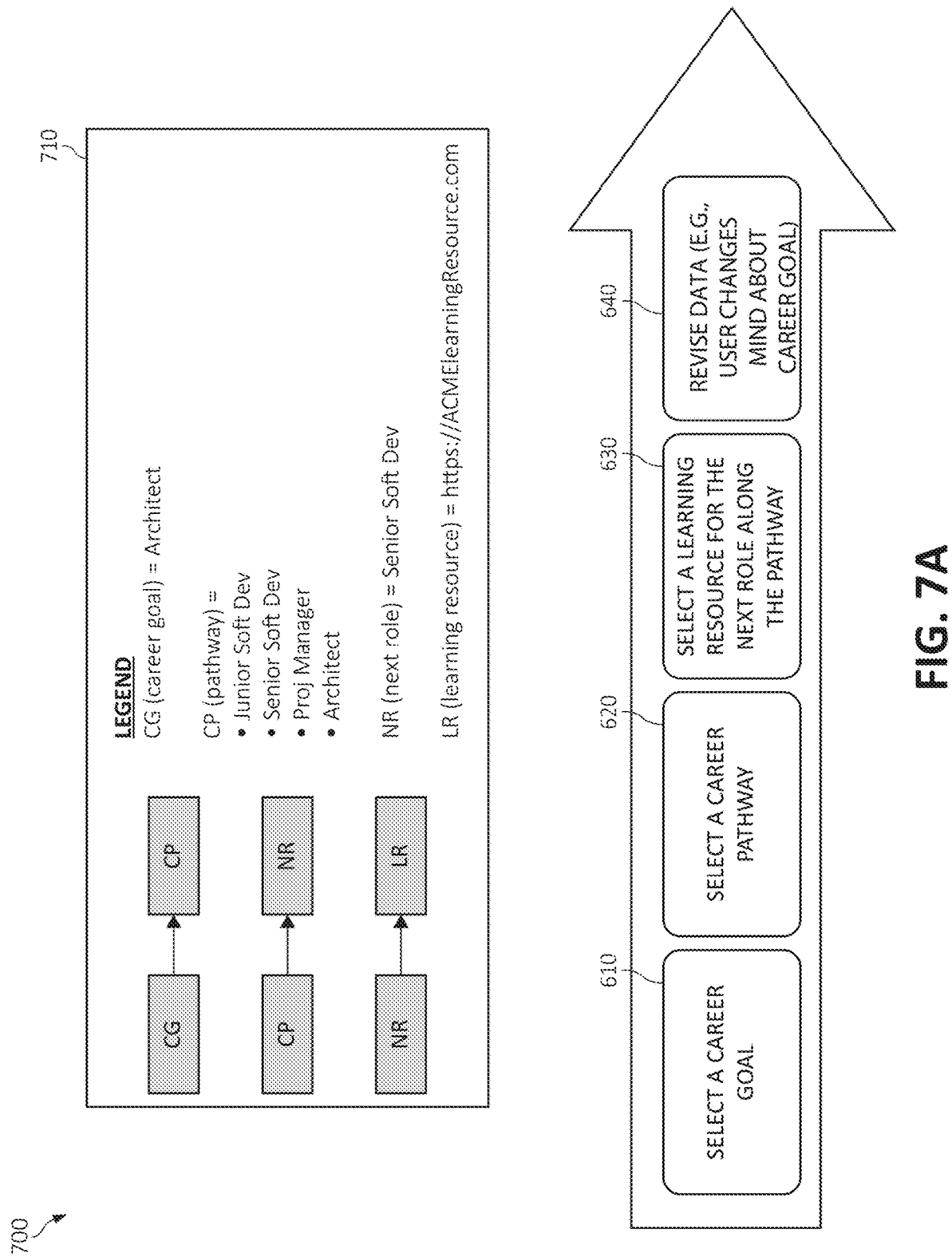
FIG. 7A-7B is an additional block diagram depicting operations for re-elicitation of variables impacted by revised information in a dialog system in a computing environment in accordance with an embodiment of the present invention.
Figure 7B:
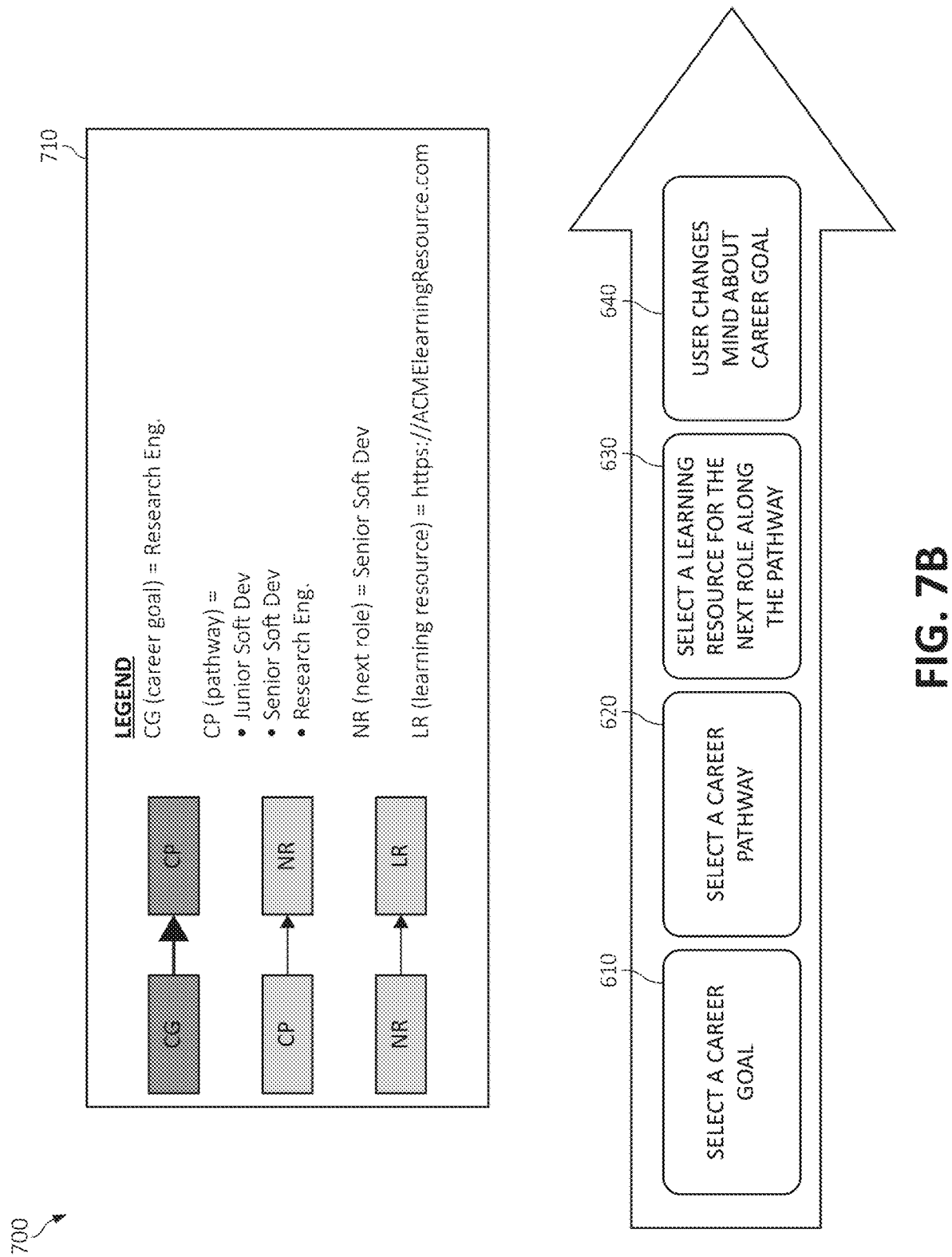

Turning now to FIG. 7A-7B, block diagram 700 depicting operations for re-elicitation of variables 710 impacted by revised information in a dialog system in a computing environment.

For example, as depicted in the legend of variables 710, a career pathway ("CP") variable (e.g., "architect" or software architect) may depended from a career goal ("CG") variable. The CP variable may include one or more sub-variables such as, for example, "junior software developer," "senior software developer," "project manager," and/or "architect." Thus, one or more next role variables ("NR" e.g., a subsequent task/role to be accomplished on the career pathway to achieve the career goal of "architect.") may depend on the CP variable. A learning resource variable (e.g., "LR" such as, for example, "www.ACMElearningresource.abc") may depend on the NR variable.

Continuing the exemplary operations of FIG. 6, as illustrated in FIGS. 7A-7B, the multi-turn dialog (e.g., multi-turn dialog 510 of FIG. 5) may be update one or more variables and/or dependencies based upon the revised information (as illustrated in the legend of variables 710). For example, upon the user revising (e.g., alter/change) information (e.g., change the user's mind) relating to the particular plan (e.g., changes a career goal) from block 640 of FIG. 6, the present invention may determine only those variables that require re-elicitation amongst the total number of variables (e.g., variables CG, CP, and/or LR). It should be noted that the dialog may determine that additional information is required (e.g., too early along to know exact variables) so either additional information may be requested and/or required (e.g., via multi-turn dialog operation, via a machine learning operation, and/or additional time).

Thus, for example, the dialog system (e.g., dialog system 404 of FIG. 4), using the multi-turn dialog 510, may iteratively discover those variables required to be re-elicited. In one aspect, for example, one or more of the variables may be selected according to a random selection, a selected sequential order, and/or according to user preferences).

The variable CG may first be re-elicited (e.g., re-elicited and changed from "architect" to "research engineer"). The variable CP may next be re-elicited (e.g., re-elicited and changed from "architect" to "research engineer" along the career pathway) information (as illustrated in the legend of variables 710 of FIGS. 7A-7B). Next, the NR variables may be analyzed and observed. If, for example, there are changes to the NR variables, then the LR variables may be analyzed and re-elicited and then the LR variables may be analyzed and re-elicited.

Also, while re-eliciting the one or more variables and dependencies, one or more options that are available may be selected. For those various available options for the variables requiring re-elicitation, a number of previous choice that may be maintained (e.g., without changing) may be estimated along with a length of a follow-up dialog (e.g., a number of dialog turns) with the user may be estimated. Also, an expected number of dialog turns remaining in the dialog according the revised information may be estimated and a selected number of previous decisions that remain unchanged based on the revised information may be estimated.

Figure 8:
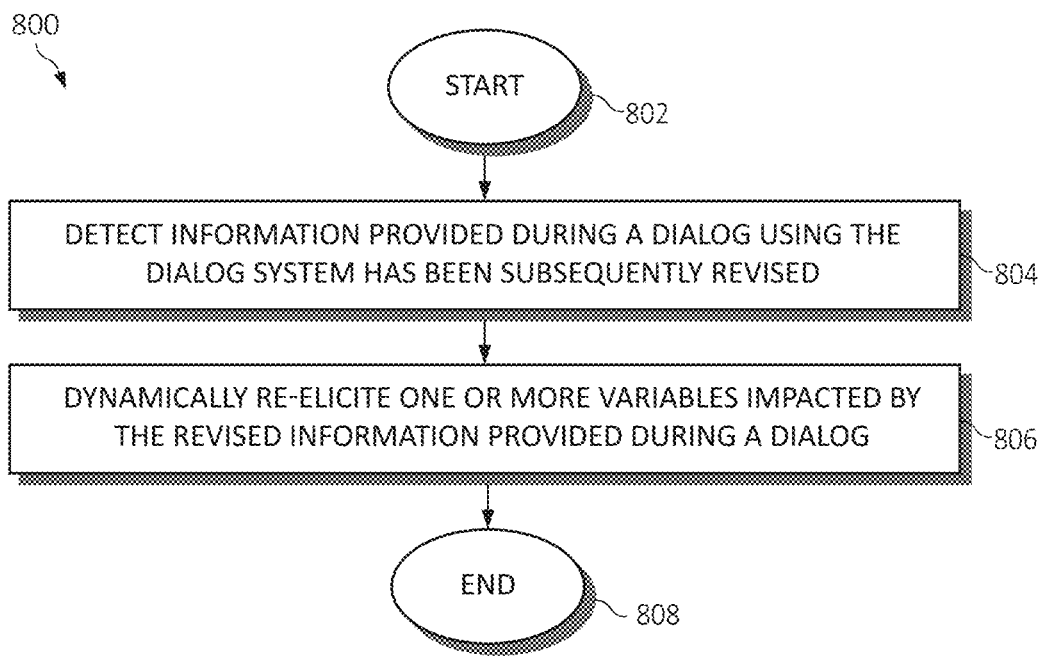
FIG. 8 is a flowchart diagram depicting an exemplary method for providing intelligent dialog re-elicitation in a dialog system in a computing environment in accordance with an embodiment of the present invention.

Turning now to FIG. 8, an additional method 800 for providing intelligent dialog re-elicitation in a dialog system in a dialog system in a computing environment by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

Information, provided during a dialog using the dialog system, may be detected that has been subsequently revised, as in block 804. One or more variables impacted by the revised information provided during the dialog may be dynamically re-elicited, as in block 806. The functionality 800 may end in block 808.

In one aspect, in conjunction with and/or as part of at least one block of FIG. 8 the operations of 800 may include each of the following. The operations of 800 may maintain a dialog plan or goal of the dialog while dynamically re-eliciting the one or more variables. The operations of 800 may identify and learn a plurality of dependencies between the one or more variables impacted by the revised information relating to the dialog, a plurality of historical dialogs, or a combination thereof, and/or identify those of the one or more variables impacted by the revised information.

The operations of 800 may estimate an expected number of dialog turns remaining in the dialog according the revised information, wherein a dialog turn is at least one communication each between the dialog system and a user, and/or estimate a selected number of previous decision that remain unchanged based on the revised information.

The operations of 800 may determine a degree of impact upon the one or more variables caused by the revised information, and/or confirm or reject one or more changes to the one or more variables having the degree of impact less than a defined threshold. The operations of 800 may initialize a machine learning mechanism to learn the one or more variables impacted by the revised information, learn those of the one or more variables to re-elicit, suggest one or more alternative action steps, task, or event to maintain dialog plan or goal of the dialog, or providing one or more simulated dialog turns remaining in the dialog according the revised information, wherein a dialog turn is at least one communication each between the dialog system and a user.

The operations of 800 may initialize an interface of the dialog system (e.g., a graphical user interface 'GUI') and may be personalized, customized, and/or adjusted according to the dialog.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method, by a processor, for providing intelligent dialog re-elicitation in a dialog system, comprising:
   detecting information provided during a dialog using the dialog system has been subsequently revised; and
   dynamically re-eliciting one or more variables impacted by the revised information provided during the dialog, wherein dynamically re-eliciting the one or more variables includes estimating an expected number of dialog turns, of at least one communication each between the dialog system and a user, are remaining in the dialog according to the revised information, and estimating a selected number of previous decisions that remain unchanged based on the revised information.

2. The method of claim 1, further including maintaining a dialog plan or goal of the dialog while dynamically re-eliciting the one or more variables.

3. The method of claim 1, further including identifying and learning a plurality of dependencies between the one or more variables impacted by the revised information relating to the dialog, a plurality of historical dialogs, or a combination thereof.

4. The method of claim 1, further including identifying those of the one or more variables impacted by the revised information.

5. The method of claim 1, further including:
   determining a degree of impact upon the one or more variables caused by the revised information; and
   confirming or rejecting one or more changes to the one or more variables having the degree of impact less than a defined threshold.

6. The method of claim 1, further including initializing a machine learning mechanism to learn the one or more variables impacted by the revised information, learn those of the one or more variables to re-elicit, suggest one or more alternative action steps, task, or event to maintain dialog plan or goal of the dialog, or providing one or more simulated dialog turns remaining in the dialog according the revised information.

7. A system, for providing intelligent dialog re-elicitation in a dialog system in a computing environment, comprising:

one or more processors with executable instructions that when executed cause the system to:

detect information provided during a dialog using the dialog system has been subsequently revised; and dynamically re-elicit one or more variables impacted by the revised information provided during the dialog, wherein dynamically re-eliciting the one or more variables includes estimating an expected number of dialog turns, of at least one communication each between the dialog system and a user, are remaining in the dialog according to the revised information, and estimating a selected number of previous decisions that remain unchanged based on the revised information.

8. The system of claim 7, wherein the executable instructions maintain a dialog plan or goal of the dialog while dynamically re-eliciting the one or more variables.

9. The system of claim 7, wherein the executable instructions identify and learn a plurality of dependencies between the one or more variables impacted by the revised information relating to the dialog, a plurality of historical dialogs, or a combination thereof.

10. The system of claim 7, wherein the executable instructions identify those of the one or more variables impacted by the revised information.

11. The system of claim 7, wherein the executable instructions:

determine a degree of impact upon the one or more variables caused by the revised information; and confirm or reject one or more changes to the one or more variables having the degree of impact less than a defined threshold.

12. The system of claim 7, wherein the executable instructions initialize a machine learning mechanism to learn the one or more variables impacted by the revised information, learn those of the one or more variables to re-elicit, suggest one or more alternative action steps, task, or event to maintain dialog plan or goal of the dialog, or providing one or more simulated dialog turns remaining in the dialog according the revised information.

13. A computer program product for, by one or more processors, providing intelligent dialog re-elicitation in a dialog system in a computing environment, the computer program product comprising a non-transitory computer-readable storage medium having computer-readable program code portions stored therein, the computer-readable program code portions comprising:

an executable portion that detects information provided during a dialog using the dialog system has been subsequently revised; and an executable portion that dynamically re-elicits one or more variables impacted by the revised information provided during the dialog, wherein dynamically re-eliciting the one or more variables includes estimating an expected number of dialog turns, of at least one communication each between the dialog system and a user, are remaining in the dialog according to the revised information, and estimating a selected number of previous decisions that remain unchanged based on the revised information.

14. The computer program product of claim 13, further including an executable that maintains a dialog plan or goal of the dialog while dynamically re-eliciting the one or more variables.

15. The computer program product of claim 13, further including an executable that:

identifies those of the one or more variables impacted by the revised information; and identifies and learns a plurality of dependencies between the one or more variables impacted by the revised information relating to the dialog, a plurality of historical dialogs, or a combination thereof.

16. The computer program product of claim 13, further including an executable that:

determines a degree of impact upon the one or more variables caused by the revised information; and confirms or rejects one or more changes to the one or more variables having the degree of impact less than a defined threshold.

17. The computer program product of claim 13, further including an executable that initialize a machine learning mechanism to learn the one or more variables impacted by the revised information, learn those of the one or more variables to re-elicit, suggest one or more alternative action steps, task, or event to maintain dialog plan or goal of the dialog, or providing one or more simulated dialog turns remaining in the dialog according the revised information.

* * * * *